(12) United States Patent
Milnes et al.

(10) Patent No.: US 6,567,606 B2
(45) Date of Patent: *May 20, 2003

(54) ON SCREEN VCR PROGRAMMING GUIDE (75) Inventors: Kenneth A. Milnes, Fremont, CA (US); Steven Schein, Menlo Park, CA (US)

(73) Assignee: Starsight Telecast Incorporation, Fremont, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/675,884

(22) Filed: Jul. 5, 1996

(65) Prior Publication Data
US 2001/0033738 A1 Oct. 25, 2001

(51) Int. Cl.$^7$ ................................................ H04N 5/91
(52) U.S. Cl. ................................... 386/83; 348/906
(58) Field of Search ......................... 386/83, 46, 95; 348/906, 5.5, 563; 725/13; H04N 5/76

(56) References Cited

U.S. PATENT DOCUMENTS

| | | | |
|---|---|---|---|
| 4,193,120 A | 3/1980 | Yello ............................ 386/83 |
| 4,305,101 A | 12/1981 | Yarborough et al. .......... 386/96 |
| 4,325,081 A | 4/1982 | Abe et al. ..................... 386/83 |
| 4,641,205 A | 2/1987 | Beyers, Jr. .................... 386/83 |
| 4,706,121 A | * 11/1987 | Young .......................... 386/83 |
| 4,847,696 A | * 7/1989 | Matsumoto et al. .......... 386/83 |
| 4,873,584 A | * 10/1989 | Hashimoto ................... 386/83 |
| 4,908,713 A | 3/1990 | Levine ......................... 386/83 |
| 4,963,994 A | 10/1990 | Levine ......................... 386/83 |
| 5,123,046 A | 6/1992 | Levine ......................... 386/83 |
| 5,307,173 A | 4/1994 | Yuen et al. ................... 386/83 |
| 5,335,277 A | 8/1994 | Harvey et al. ................ 380/20 |
| 5,351,075 A | * 9/1994 | Herz et al. .................... 725/13 |
| 5,353,121 A | 10/1994 | Young et al. ................. 348/563 |
| 5,479,268 A | * 12/1995 | Young et al. ................. 386/83 |
| 5,731,844 A | * 3/1998 | Rauch et al. ................. 348/563 |
| 6,025,869 A | * 2/2000 | Stas et al. .................... 348/5.5 |
| 6,137,950 A | * 10/2000 | Yuen ............................ 386/83 |

OTHER PUBLICATIONS

"Using Starsight 2" User's Manual, StarSight Telecast, Inc. ©1994.

* cited by examiner

Primary Examiner—Huy Nguyen
(74) Attorney, Agent, or Firm—Christie, Parker & Hale, LLP (57) ABSTRACT

An apparatus and method for programming a VCR is provided. The system, utilizing a programming controller, presents a display on the viewer's television which contains a pattern representing a plurality of time intervals. The user programs the controller by indicating what time intervals on what week and on what channel are to be recorded. The controller then continually compares the current time with the programmed time until a match is found. When a match is found the controller activates the VCR, tunes the VCR to the desired channel, and initiates recording. When the controller determines that the VCR has recorded for the desired length of time, it stops the VCR from further recording and turns off the power to the VCR.

18 Claims, 7 Drawing Sheets

ON SCREEN VCR PROGRAMMING GUIDE

BACKGROUND OF THE INVENTION

The present invention relates generally to a system for programming a VCR and, more particularly, to a system and process for allowing a television user to easily program a VCR to record future programs.

The difficulty of setting a VCR for automatic recording at a future date is notorious. Even users who are technically sophisticated will often make mistakes in the VCR programming procedure that cause them to record the wrong program or not to record anything at all. This difficulty has even resulted in a substantial body of humor dedicated to the subject of programming VCRs.

The difficulty of VCR programming has been alleviated somewhat by the development of VCRs that use a television set as a display for user prompts and feedback to the user during the programming process. U.S. Pat. No. 4,908,713, issued Mar. 30, 1990 to Michael R. Levine, discloses such a VCR using the television set as a display for VCR programming with an interactive user interface for directing the user on a step-by-step basis. Such a user interface removes a great deal of the mystery from VCR programming, but users still have difficulty with such a command-based interface and encounter problems carrying out the programming without making mistakes that cause them to miss recording programs they would like to watch at a different time than when they are broadcast.

Commonly assigned U.S. Pat. No. 4,706,121, issued Nov. 10, 1987 to Patrick Young, discloses a system and process in which user selections from television schedule information are used for automatic control of a VCR. That patent also contains a description of a proposed user interface for such a system and process. However, the provision of a highly intuitive user interface that makes such a system and process easy and convenient to operate is a difficult task. Further development of this system and process has produced considerable change in the user interface as originally proposed.

From the foregoing, it is apparent that a simplified system for programming a VCR is desired.

SUMMARY OF THE INVENTION

The present invention provides a simple and convenient method and apparatus for programming a VCR. The system, utilizing a programming controller, presents a display on the viewer's television which contains a pattern representing a plurality of time intervals. The user programs the controller by indicating what time intervals on what week and on what channel are to be recorded. The controller then continually compares the current time with the programmed time until a match is found. When a match is found the controller activates the VCR, tunes the VCR to the desired channel, and initiates recording. When the controller determines that the VCR has recorded for the desired length of time, it stops the VCR from continuing to record and turns off the VCR's power.

In one embodiment of the invention, the programming display screen presents sufficient time indicators for a full seven day week. Each day is broken into 48 half hour intervals. The user is also able to select the week for which the programming instructions apply as well as whether the instructions apply once, on a daily basis, or on a weekly basis. After the user selects the recording time, day, and week, the controller requires that the user input the desired channel.

In another embodiment of the invention, the programming display screen presents a series of ½ hour time segments, beginning with the current time, for every channel of the user's television system. The user scrolls along the vertical axis to change the channel selection and scrolls along the horizontal axis to change the selected time interval.

A further understanding of the nature and advantages of the present invention may be realized by reference to the remaining portions of the specification and the drawings.

NOTE: Many of the names in the figures and/or specification may be the trademarks/servicemarks of others. Such names include "HBO" and "NBC."

DESCRIPTION OF THE PREFERRED EMBODIMENT

Figure 1:
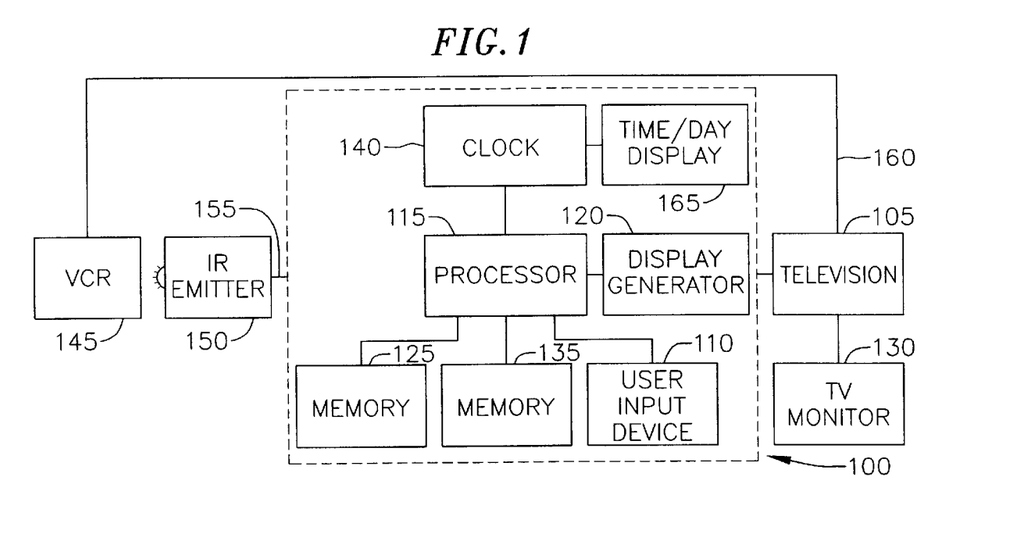
FIG. 1 is a block diagram of an embodiment of the invention utilizing a stand-alone programming controller.

FIG. 1 is a block diagram of one embodiment of the invention. In this embodiment a programming controller 100 is coupled to a television 105. When programming controller 100 is activated by a user using an input device 110, a data processor 115 coupled to a data generator 120 generates a VCR programming instructional display. The information for the blank instructional display is stored in memory 125, preferably a ROM device. The display is presented on a television screen 130. The user selects the time of day, the day of the week, and the channel on which programming is to be recorded. The user also indicates the desired duration of recording. All of the VCR programming information is stored in a memory 135. A clock 140, integral to controller 100, tracks the time of day as well as the day of the week. When processor 115 determines that the actual time of the day as well as the day of the week match the stored VCR programming instructions, processor 115 turns the power on VCR 145, adjusts the VCR tuner to the desired channel, and initiates recording. When processor 115 determines that the selected recording duration has been completed, recording on VCR 145 is stopped and the power to VCR 145 is turned off.

In the preferred embodiment of the invention, controller 100 controls VCR 145 with an IR emitter 150. IR emitter 150 is capable of emulating the infrared command instructions required by VCR 145. Typically IR emitter 150 is placed at the end of a cable 155. Cable 155 allows IR emitter 150 to be placed proximate to the IR receiver of VCR 145. If desired, a look-up table of emulation commands can be stored in memory 125 thus allowing IR emitter 150 to emulate the IR command instructions for a variety of VCRs. Preferably the user inputs the selected VCR into controller 100 using input device 110. Once a VCR has been selected, controller 100 determines the appropriate set of VCR commands utilizing the look-up table.

When the viewer wishes to play a prerecorded tape, the signal from VCR 145 to television 105 is sent via cable 160 as in a standard system. Furthermore, controller 100 does not inhibit the standard features of VCR 145. Therefore the viewer can still program VCR 145 using the standard programming techniques for which VCR 145 was originally designed, i.e., using a series of programming steps or a menu system displayed on television monitor 130.

Preferably, clock 140 is coupled to a read-out display 165. Display 165 shows the current time and day, thus allowing the user to easily check the accuracy of controller 100. In an alternate embodiment, the current time and day as recognized by clock 140 is presented on the VCR instructional display on television monitor 130, this display being shown whenever the programming controller is activated. Although this embodiment requires that the user activate controller 100 to determine the accuracy of clock 140, it has the advantage of size since controller 100 can now be further miniaturized. Furthermore, this embodiment allows the user to place controller 100 in a wider variety of locations since display 165 does not need to be easily viewable by the user.

Figure 2:
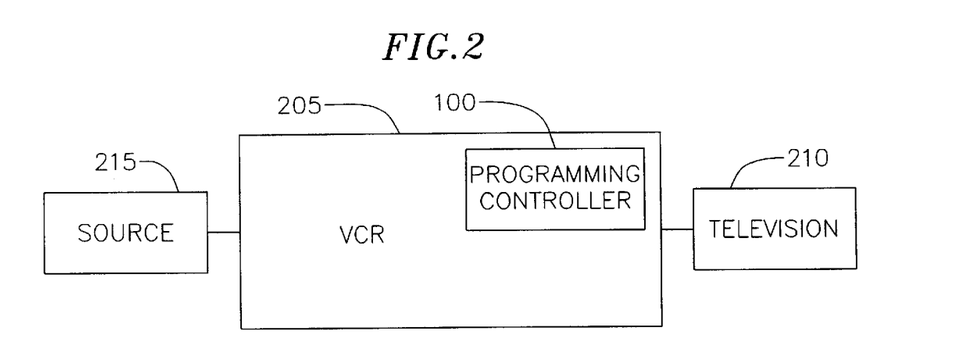
FIG. 2 is a block diagram of an embodiment of the invention in which the programming controller is integrated into the VCR.

FIG. 2 is a block diagram illustrating an alternate embodiment of the invention. In this embodiment programming controller 100 is within a VCR 205. VCR 205 is connected to a television 210 and at least one source 215. In this embodiment the clock which is integral to controller 100 is preferably the same clock as that utilized in the VCR.

Figure 3:
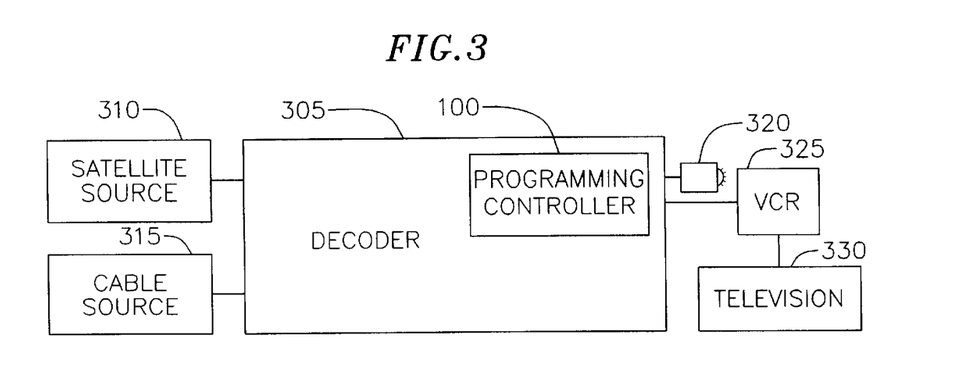
FIG. 3 is a block diagram of an embodiment of the invention in which the programming controller is integrated into a decoder box.

FIG. 3 is a block diagram illustrating another embodiment of the invention. In this embodiment programming controller 100 is integrated into a stand-alone device, such as a decoder 305. Decoder 305 may be of the sort used with a cable source 310 or a satellite direct broadcast source 315. As in the system illustrated in FIG. 1, this embodiment of the invention requires an IR emitter 320 to control a VCR 325. Typically a television 330 is connected directly to VCR 325 although in some systems it may be connected directly to decoder 305. Alternatively, television 330 may be combined into one unit with VCR 325 to comprise a TVCR.

In an alternate embodiment, very similar to that illustrated in FIG. 3, controller 100 is integrated into a personal computer (PC). In this embodiment the PC may be used in conjunction with the television system to supply the user with capabilities such as Internet access. The functionality of controller 100 can be easily integrated into the PC.

Figure 4:
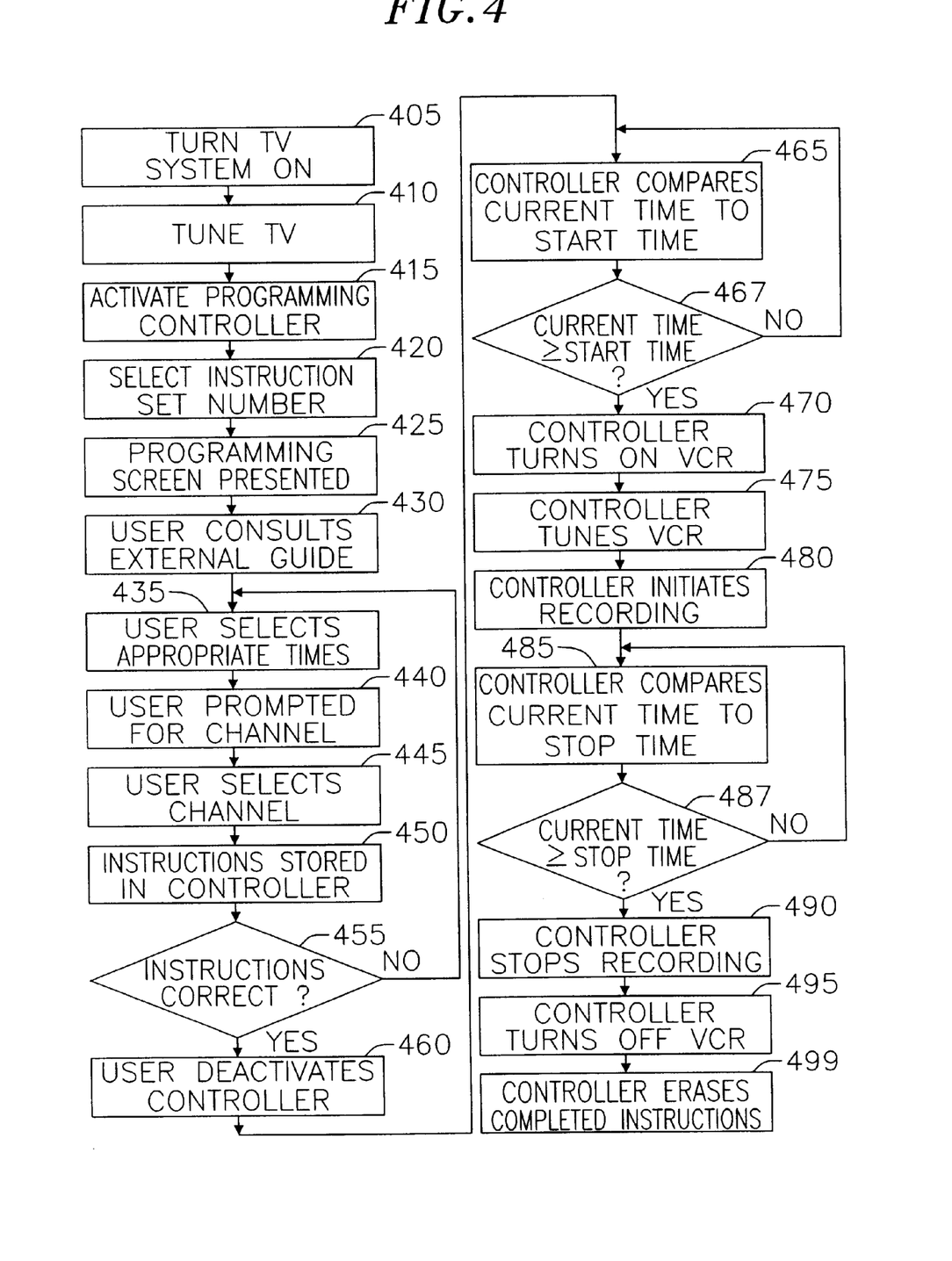
FIG. 4 is a flow chart illustrating the operation of the preferred embodiment of the invention.

FIG. 4 is a flow chart illustrating the operation of the preferred embodiment of the invention. To program the user's VCR, the user turns on the television system (step 405), sets the television to the appropriate channel (step 410), and activates the programming controller (step 415). The television must be set to a predetermined channel since the programming controller only sends out programming information over a narrow frequency band. In the preferred embodiment the user is given a choice of channels, typically channels 3 and 4. The programming controller includes a switch which allows the user to select the corresponding channel, preferably the channel with the least use in the viewer's geographic region.

After the controller has been activated, in the preferred embodiment of the invention the user is prompted to input an instruction set number (step 420). Although this step is not required, in the preferred embodiment of the invention the user is allowed to input several sets of VCR programming instructions into the controller. Therefore in this embodiment the user is able to use the controller to record numerous programs. Preferably the controller tracks the number of instructional sets entered and unexecuted to date and prompts the user to select the next number in the series. This system also allows the user to go back to a previously entered set of programming instructions and modify those instructions.

In the next step of programming the controller a display is presented on the viewer's television (step 425). The display contains a pattern representing the times of day, preferably in 30 minute increments and for each day of a seven day week. After deciding the desired recording time, typically using a printed program guide (step 430), the user selects the corresponding times from the display pattern (step 435). In the preferred embodiment of the invention, after the user selects the recording time and date, a prompt appears asking the user to input the desired channel (step 440). The user inputs the channel, preferably by pressing the number on a remote control (step 445). The set of VCR instructions comprised of the record start time, record stop time, day of the week, and channel are stored within the controller (step 450).

After the user has input the set of VCR programming instructions, the controller displays the selected information and asks the user to verify that the proper choices have been stored (step 455). Assuming that the user neither modifies the current set of instructions or seeks to input additional instructions, the user deactivates the controller and resumes the normal use of the television (step 460).

The controller continuously monitors the current time and day, comparing the data with the stored VCR programming instructions (step 465). When the current time is greater than or equal to the stored start time (step 467), the controller turns on the VCR (step 470), tunes the VCR to the selected channel (step 475), and initiates recording (step 480). When the controller determines that the current time is greater than or equal to the desired stop time (steps 485 and 487), the controller stops the recording (490), turns off the VCR (step 495), and erases the set of programming instructions from the controller memory (step 499).

Figure 5:
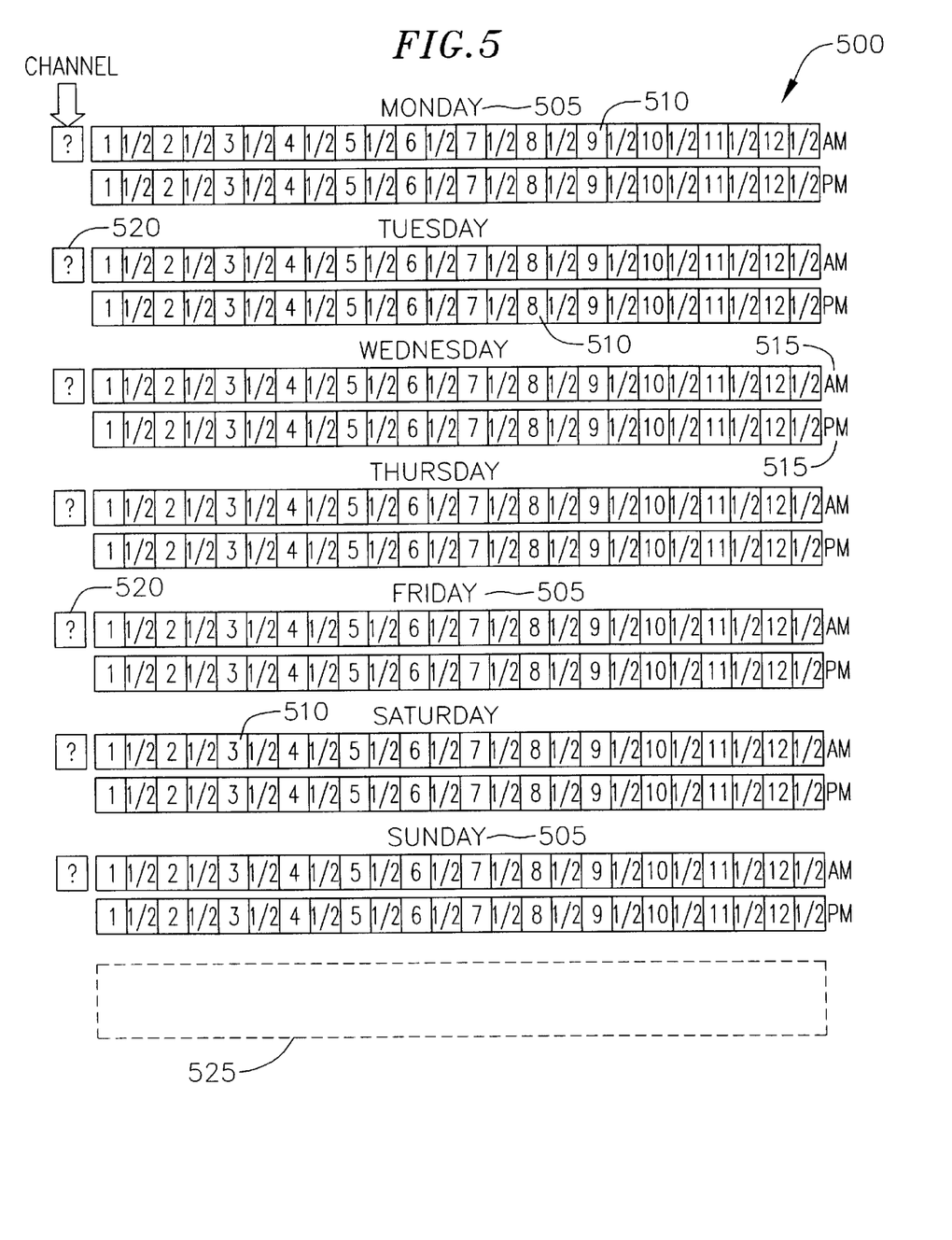
FIG. 5 is an illustration of the preferred embodiment of the VCR programming screen.

FIG. 5 is an illustration of the preferred embodiment of a VCR programming screen 500. Screen 500 is divided into a seven day grid. The day of the week is indicated in a portion 505. Adjacent to each day of the week 505 is a linear grid 510. Grid 510 divides each 24 hour day into 48 half hour increments.

In the preferred embodiment, the user selects the times over which recording is desired, for example by moving a cursor to the desired time slot and pressing ENTER. In order to aid the user in navigating through the programming screen, preferably each grid segment becomes temporarily highlighted as the cursor passes over it. Thus if the user wishes to record a program on Thursday night starting at 9:00 PM and ending at 9:30 PM, the user simply moves the cursor to the 9:00 PM slot for Thursday night and presses enter. In the preferred embodiment, if the user wishes to record a program which lasts longer than 30 minutes, the user moves the cursor to each successive time slot and presses enter.

After the user indicates a specific day and time period, in this embodiment the program guide requests that the user enter a channel number. In one embodiment screen 500 begins flashing a question mark (i.e., "?") in a portion 520 adjacent to the day of the week on which recording has been requested. The system can also be designed to send the user a request to input the desired channel, for example by scrolling a request message across screen 500 in area 525.

Once the user has indicated the time, day, and channel for recording, the system may notify the user that either the programming has been successfully completed or that the programming was not successfully completed. An example of why the programming may have been unsuccessful is that the user programmed the system to record two different channels at the same time.

Figure 6:
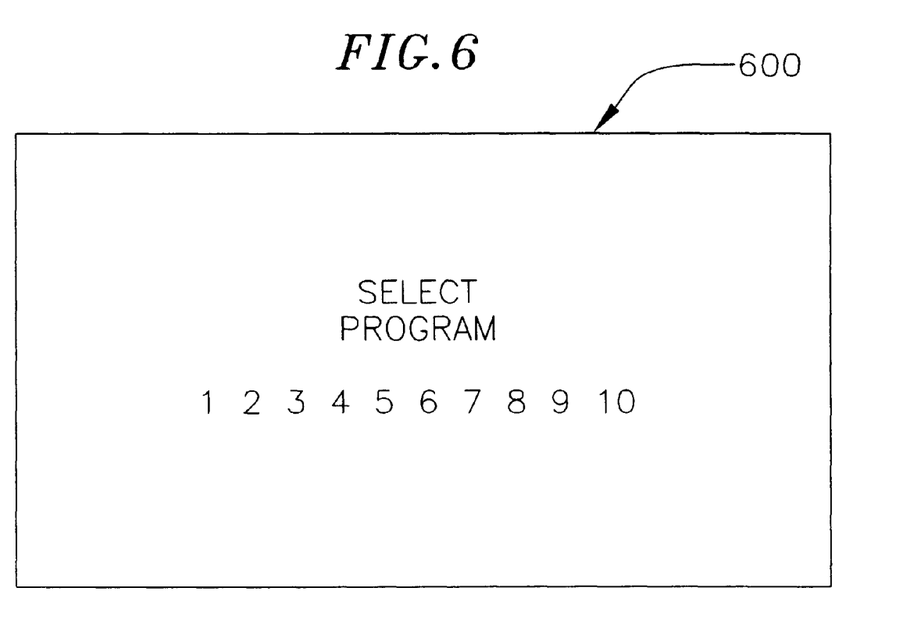
FIG. 6 is an illustration of a screen which prompts the user to select a specific program, a program representing an individual set of VCR programming instructions.

In one embodiment of the invention, the system allows the user to input several sets of VCR programming instructions. Preferably in this embodiment when the user initiates the system a screen 600 appears, as illustrated in FIG. 6. Screen 600 prompts the user to select a specific PROGRAM, in this case a program refers to a set of VCR programming instructions. Typically the user would select a program using either a cursor, or by simply typing in the desired number on the remote keypad. If the user wants to modify a previously input program, they simply select the representative program number. The system can be designed to prompt the user as to the next available program, for example by flashing the number of the next available program.

Figure 7:
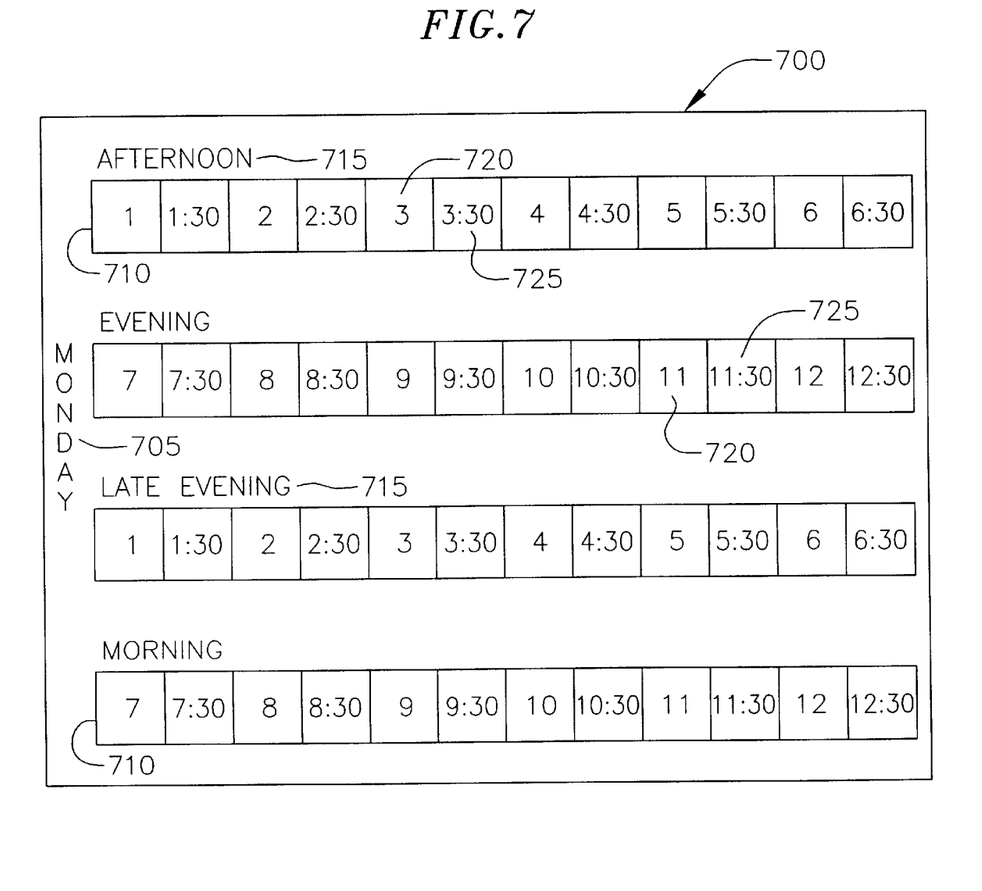
FIG. 7 is an illustration of an alternate VCR programming screen according to the present invention which only shows a single day of programming time segments.

Due to the limited resolution of a standard television screen as seen from a standard viewing distance, a screen which conveys less information than screen 500 may be preferable. FIG. 7 is an illustration of a screen 700. Instead of showing information for a full 7 day schedule, screen 700 only provides a single day of programming. The day of the week for which the programming information is provided is shown in a cell 705. Preferably the day shown in portion 705 is the current day. If the user wishes to input programming instructions for a later day, the user scrolls through the days using DAY UP and DAY DOWN buttons on the remote control device. In order to conserve space, simple arrow buttons can be used, thus allowing the same buttons to be used for a variety of functions.

Screen 700 breaks the 24 hour day into 48 individual thirty minute intervals. Although the 48 intervals can be presented in a variety of ways, preferably they are spread throughout four rows 710. To help the user navigate through the grid, above each row is a time of day descriptor 715 such as AFTERNOON. Another aid to user navigation is to color code the time segments. For example, all segments 720 representing hours (e.g., 12, 1, 2, etc.) may be of one color while all segments 725 representing ½ hours (e.g., 12:30, 1:30, 2:30, etc.) may be of a second color.

Figure 8:
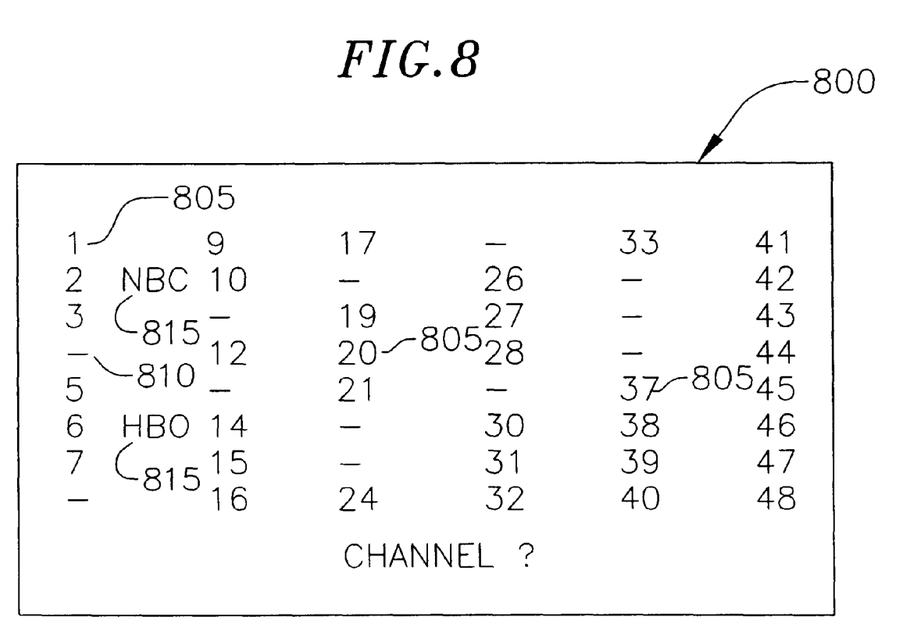
FIG. 8 is an illustration of a channel selection screen.

In an embodiment of the invention utilizing screen 700, once the user has selected the day and time, a separate screen 800 is displayed. Screen 800 is a channel selection screen. Screen 800 has a table of channel numbers 805 from which the user selects the desired channel. Preferably screen 800 is limited to the channels available on the user's television system, thereby avoiding confusion and minimizing errors. For example, in screen 800 a "–" is shown at portion 810 between channels 3 and 5, thus indicating that channel 4 is not available through the user's television system. Another aid to identifying channels is the use of broadcaster designators, for example HBO and NBC shown at 815.

Figure 9:
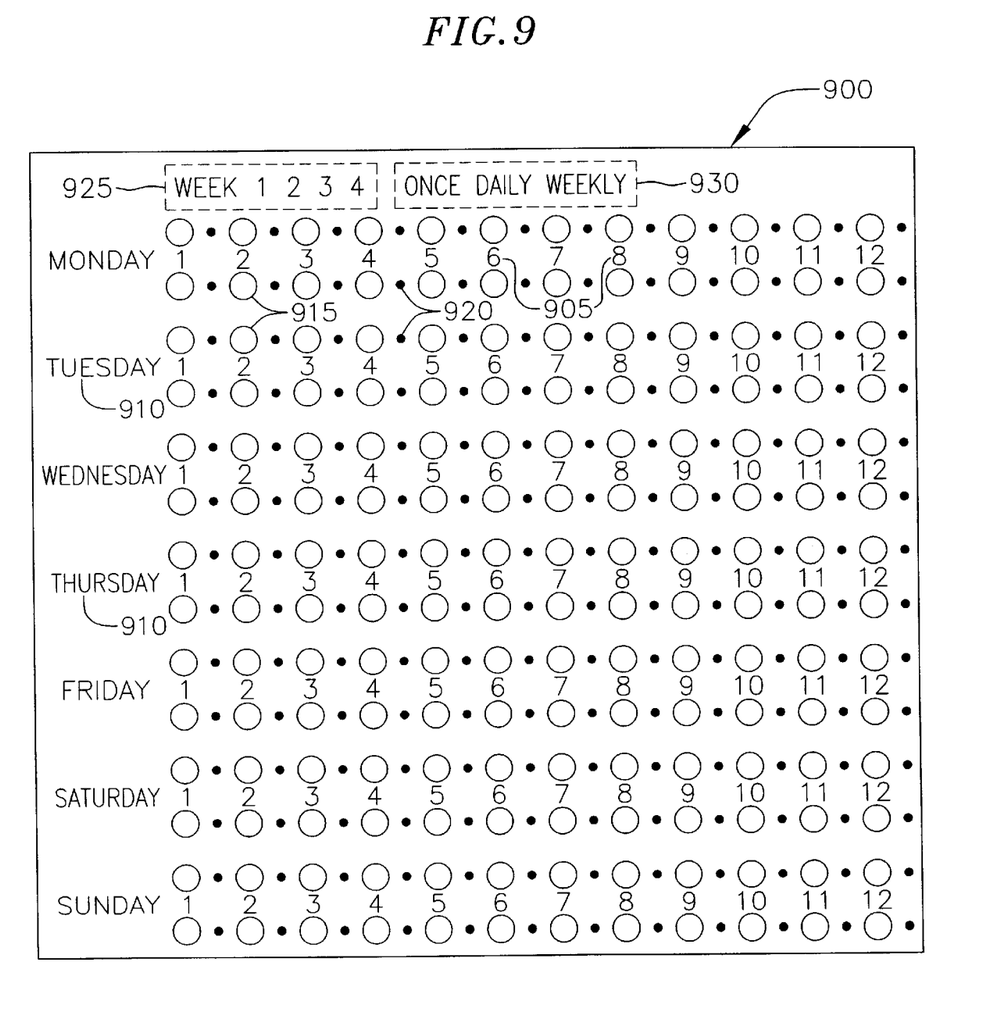
FIG. 9 is an illustration of an alternate VCR programming screen according to the present invention which utilizes indicators instead of a grid structure.

FIG. 9 is an illustration of an alternate programming screen 900. Screen 900 is similar to screen 500 in that 7 days of time intervals are shown in a single screen. However, the layout of screen 900 permits larger numbers 905 representing the times, thus making the screen more readable from a distance. For each day 910 only a single set of numbers 905 are required. Above and below each number is an indicator 915, such as a circle, the indicators above the numbers representing AM times and the indicators below the numbers representing PM times. In between each hourly indicator is a ½ hour indicator 920. Preferably indicators 920 are easily distinguishable from indicators 915, for example by size or color.

Figure 10:
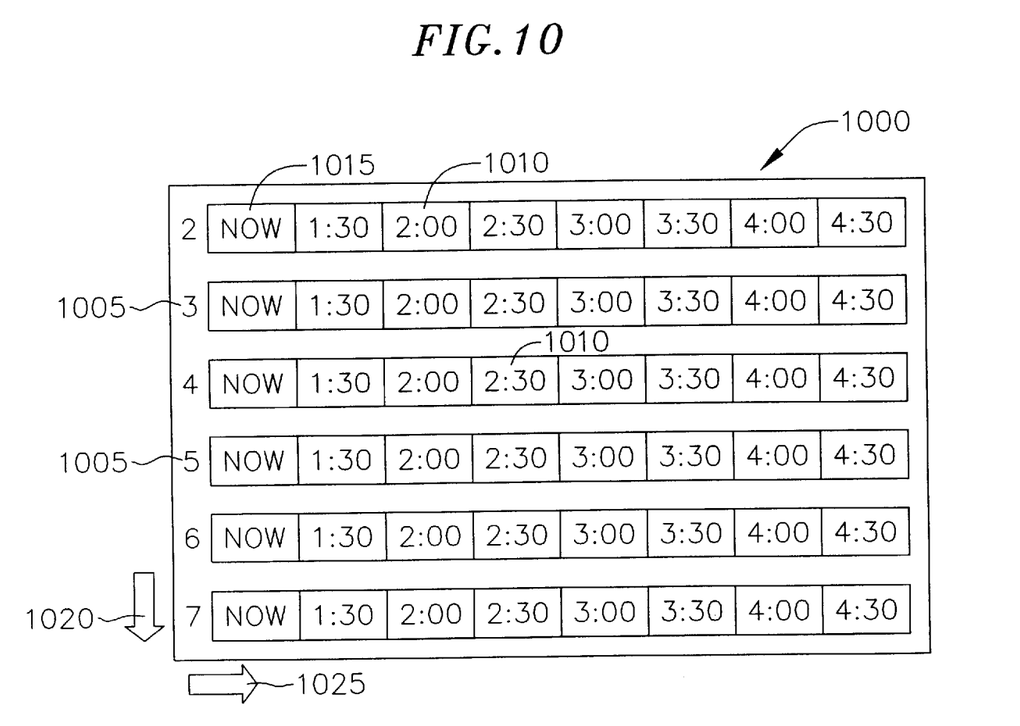
FIG. 10 is an illustration of an alternate VCR programming screen according to the present invention which presents a series of time indicators adjacent to each individual channel.

FIG. 10 is an illustration of an alternate programming screen 1000. Screen 1000 is divided between channel indicators 1005 and time indicators 1010. Preferably the first time indicator 1015 for each channel represents the current time. Thus in screen 1000 the current time 1015 must be 1:00 since the next time 1010 following the current time is 1:30. In using this screen, the user scrolls down the screen in a direction 1020 until the desired channel is found, potentially scrolling through numerous pages or screens. After finding the desired channel, the user scrolls in a direction 1025 until the desired recording time is found, also potentially scrolling through numerous pages or screens.

In an alternate embodiment of the invention, prior to initiating recording the programming controller 100 determines if the VCR is in a power on or power off state. If the VCR is in a power on state, when the programming controller determines that it is time to begin recording, it simply tunes the VCR tuner to the selected channel and initiates recording, thus eliminating step 470 illustrated in FIG. 4. If, on the other hand, the VCR is in a power off state, the programming controller turns the VCR on before initiating recording. This feature eliminates the risk of missing a planned recording session due to the user inadvertently leaving the VCR's power on.

In an alternate embodiment of the invention, after a set of VCR programming instructions has been input into the programming controller, the programming controller determines whether or not the VCR contains a tape. This feature is most easily added to a controller which is integral to the VCR as illustrated in FIG. 2.

In an alternate embodiment of the invention, the VCR programming screen allows the user to select the week for which the VCR programming instructions are to apply. For example, a portion 925 of screen 900 lists weeks 1 through 4. Therefore if a user wishes to record a ½ hour program at 8:30 PM, a week from tomorrow, the user would first select "2" from portion 925 to indicate that the desired program is not shown at 8:30 PM tomorrow, but rather a week from tomorrow.

Another feature which can be implemented with the present invention is illustrated in portion 930 of FIG. 9. Portion 930 lists three choices for the user: ONCE, DAILY, WEEKLY. If the user selects ONCE, then the VCR programming instructions input by the user will be applied once and then erased from memory. If the user selects DAILY, then every day at the same time the controller will cause the VCR to record the designated time slot until this instruction is erased by the user. If the user selects WEEKLY, then every week at the same time and the same day of the week, the controller will cause the VCR to record the designated time slot until this instruction is erased by the user.

As will be understood by those familiar with the art, the present invention may be embodied in other specific forms without departing from the spirit or essential characteristics thereof. Accordingly, disclosure of the preferred embodiment of the invention is intended to be illustrative, but not limiting, of the scope of the invention which is set forth in the following claims.

We claim:

1. A method of programming a VCR using a programming controller coupled with the VCR and a television monitor, the method comprising:

activating the programming controller;

selecting a programming instruction from among a set of programming instructions entered but unexecuted;

simultaneously displaying on a single display screen a plurality of patterns representative of a plurality of days;

simultaneously displaying on the single display screen a plurality of successive equal-length time segments with each of the plurality of patterns displayed, the plurality of successive equal-length time segments representative of a plurality of time periods of one entire day;

selecting a first one of the plurality of successive equal-length time segments displayed from a first one of the plurality of patterns to designate a start time that represents one day of the plurality of days and one time period;

selecting a second one of the plurality of successive equal-length time segments displayed from the first one of the plurality of patterns to designate a stop time that represents one day of the plurality of days and one time period;

selecting a channel of interest for viewing and recording and to be switched to by the VCR at the appropriate time;

storing in memory a programming instruction including the start time, the stop time, the day of the week, and the channel;

continuously monitoring the current time and day;

comparing the current time and current day of the week to the start time and the day of the week within each programming instruction among the set of programming instructions;

tuning the VCR to a channel corresponding to the channel within the programming instruction and starting a recording function on the VCR with the programming controller, when the current time and current day of the week equals the start time and the day of the week within one of the programming instructions; and stopping the recording function on the VCR with the programming controller, when the current time is greater than or equals the stop time within the programming instruction.

2. The method of claim 1 further comprising the steps of:
erasing the programming instruction from the memory.

3. The method of claim 1 further comprising the steps of:
inputting a program designator into the programming controller;

associating the program designator to indicate a specific set of programming instructions from a plurality of sets of programming instructions; and chronologically ordering the plurality of sets of programming instructions.

4. The method of claim 1 wherein each of said plurality of successive equal-length time segments represents a 30 minute durational time period.

5. The method of claim 1 wherein said selecting step is further comprised of the step of displaying and moving a cursor on the monitor to highlight the time segments selected.

6. The method of claim 1 wherein the designated start and stop times are identical.

7. A method of programming a video receiver, the method comprising:

simultaneously displaying on a single display screen a plurality of patterns representative of a plurality of days;

simultaneously displaying on the single display screen a plurality of successive time segments with each of the plurality of patterns displayed, the plurality of successive time segments representative of a plurality of time periods of one entire day;

selecting a first one of the plurality of successive time segments displayed from a first one of the plurality of patterns to designate a start time that represents one day of the plurality of days and one time period;

selecting a second one of the plurality of successive time segments displayed from the first one of the plurality of patterns to designate a stop time that represents one day of the plurality of days and one time period;

selecting a channel of interest for viewing and recording and to be switched to by the video receiver at the appropriate time;

storing in memory a programming instruction including the start time, the stop time, the day of the week, and the channel;

tuning the video receiver to a channel corresponding to the channel within the programming instruction, when current time and current day of a week corresponds to the start time and the day of the week within one of the programming instructions; and tuning the video receiver to back to a previous channel before the video receiver was tuned to the channel corresponding to the channel within the programming instruction, when current time and current day corresponds to the stop time and the one entire day within one of the programming instructions.

8. The method of claim 7 wherein the designated start and stop times are identical.

9. The method of claim 7 wherein the video receiver is one of a VCR and a television monitor.

10. A method of programming a video receiver, the method comprising:

simultaneously displaying on a single display screen a plurality of successive time segments in a plurality of rows, the plurality of rows representing days and the plurality of successive time segments in each of the plurality of rows representing a plurality of time periods for an entire day;

selecting a first one of the plurality of successive time segments displayed to designate a start time that represents a day and one time period;

selecting a second one of the plurality of successive time segments displayed to designate a stop time that represents a day and one time period;

selecting a channel to be switched to by the video receiver;

storing in memory a programming instruction including the start time, the stop time, the day and the channel;

tuning the video receiver to a channel corresponding to the channel within the programming instruction, when current time and current day corresponds to the start time and the day within one of a plurality of programming instructions; and tuning the video receiver to back to a previous channel before the video receiver was tuned to the channel corresponding to the channel within the programming instruction, when current time and current day corresponds to the stop time and the day within one of a plurality of programming instructions.

11. The method of claim 10 wherein the designated start and stop times are identical.

12. The method of claim 10 further comprising displaying vertically and adjacent to the plurality of successive time segments in the plurality of rows, a legend comprising a plurality of identifiers to identify the days.

13. The method of claim 10 wherein the video receiver is one of a VCR and a television monitor.

14. A method of programming a video receiver, the method comprising:

simultaneously displaying on a single display screen a plurality of successive time segments in a plurality of rows, the plurality of rows representing large time periods that represent days and the plurality of successive time segments in each of the plurality of rows representing a plurality of small time periods within the large time periods;

selecting a first one of the plurality of successive time segments displayed to designate a start time that represents a large time period and a small time period;

selecting a second one of the plurality of successive time segments displayed to designate a stop time that represents a large time period and a small time period;

selecting a channel to be switched to by the video receiver;

storing in memory a programming instruction including the start time, the stop time, a day and the channel;

tuning the video receiver to a channel corresponding to the channel within the programming instruction, when current time and current day corresponds to the start time and the day within one of a plurality of programming instructions; and tuning the video receiver to back to a previous channel before the video receiver was tuned to the channel corresponding to the channel within the programming instruction, when current time and current day corresponds to the stop time and the day within one of a plurality of programming instructions.

15. The method of claim 14 further comprising displaying vertically and adjacent to the plurality of successive time segments in the plurality of rows, a legend comprising a plurality of identifiers to identify the large time periods.

16. The method of claim 14 wherein each of the plurality of successive time segments in at least one of the plurality of rows have equal-lengths.

17. The method of claim 14 wherein each of the plurality of successive time segments in each of the plurality of rows have a predetermined length based on each of the large time periods represented by each of the plurality of rows.

18. The method of claim 14 wherein the video receiver is one of a VCR and a television monitor.

\* \* \* \* \*